(12) United States Patent
Ghasripoor et al.

(10) Patent No.: US 7,435,049 B2
(45) Date of Patent: Oct. 14, 2008

(54) SEALING DEVICE AND METHOD FOR TURBOMACHINERY

(75) Inventors: Farshad Ghasripoor, Scotia, NY (US); Murtuza Lokhandwalla, Clifton Park, NY (US); Raymond Edward Chupp, Glenville, NY (US); Nitin Bhate, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 787 days.

(21) Appl. No.: 10/813,102

(22) Filed: Mar. 30, 2004

(65) Prior Publication Data

US 2005/0220610 A1 Oct. 6, 2005

(51) Int. Cl.
*F01D 11/06* (2006.01)
(52) U.S. Cl. .................................. 415/173.3; 277/415
(58) Field of Classification Search .............. 415/173.3, 415/173.5, 174.2, 173.6, 174.5, 173.2, 173.4, 415/174.4
See application file for complete search history.

(56) References Cited

U.S. PATENT DOCUMENTS

| 4,135,851 | A | 1/1979 | Bill et al. ..................... 415/174 |
| 4,576,548 | A | 3/1986 | Smed et al. |
| 5,104,287 | A | 4/1992 | Ciokajlo |
| 5,108,116 | A | 4/1992 | Johnson et al. ................ 277/53 |
| 5,941,685 | A | 8/1999 | Bagepalli et al. .......... 415/173.3 |
| 5,961,125 | A | 10/1999 | Wolfe et al. .................. 277/355 |
| 6,431,827 | B1 | 8/2002 | Wolfe et al. .............. 415/173.3 |
| 6,439,844 | B1 | 8/2002 | Turnquist et al. ......... 415/173.3 |
| 6,536,773 | B2 | 3/2003 | Datta .......................... 277/355 |
| 2002/0192074 | A1* | 12/2002 | Turnquist et al. ........ 415/173.3 |

* cited by examiner

*Primary Examiner*—Richard Edgar
(74) *Attorney, Agent, or Firm*—Fletcher Yoder

(57) ABSTRACT

A compliant seal for use between rotating blades and a static shroud surrounding the rotating blades in a steam or gas turbine is disclosed. The seal includes a tip surface, substantially resistant to wear due to rubbing by the tip of the rotating blades, and an elastic biasing member, comprising a biasing element. The wear-resistant surface is thus biased against the tips of the rotating blades to seal a gas path between the rotating blades and the static shroud.

44 Claims, 7 Drawing Sheets

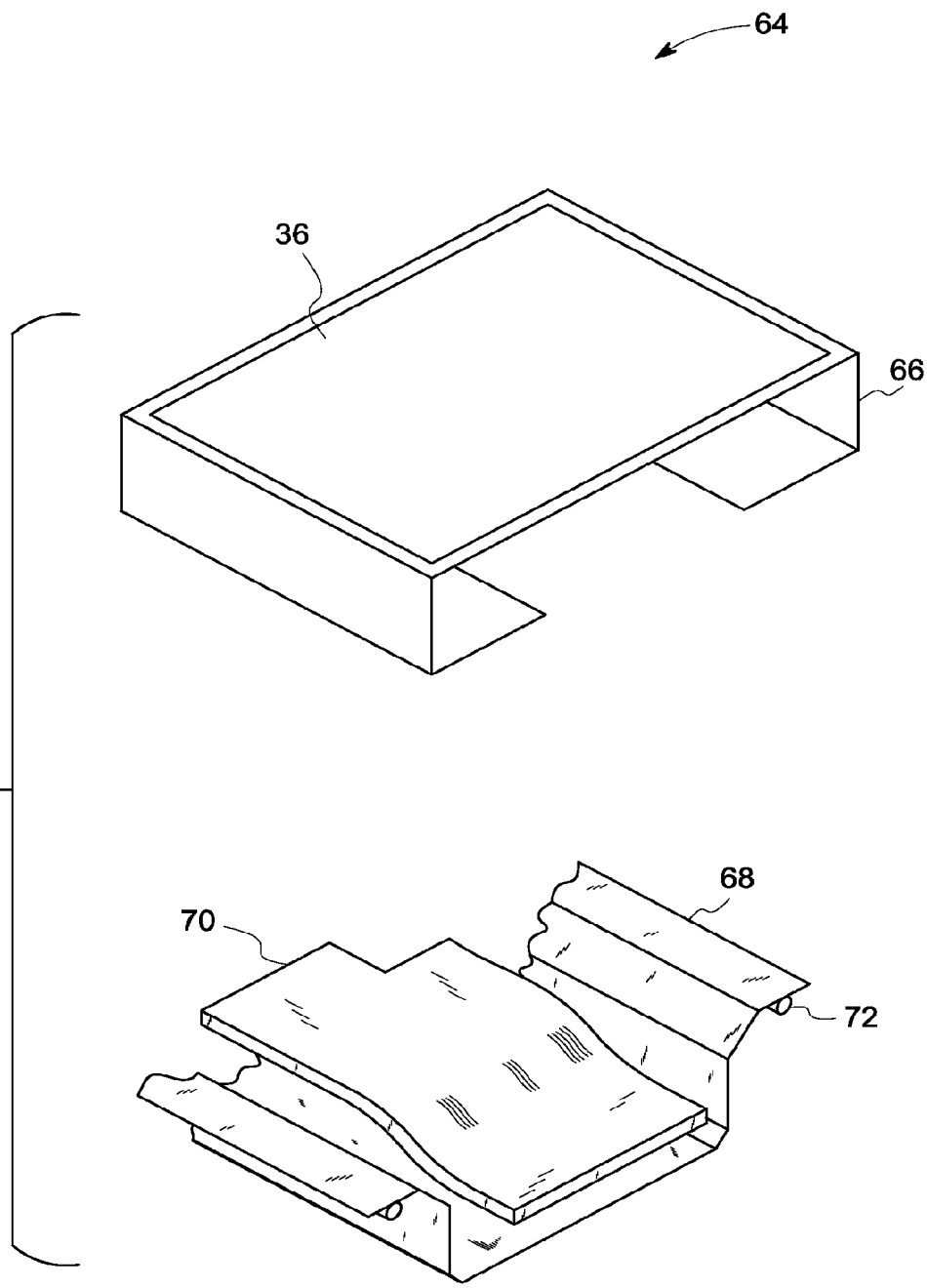

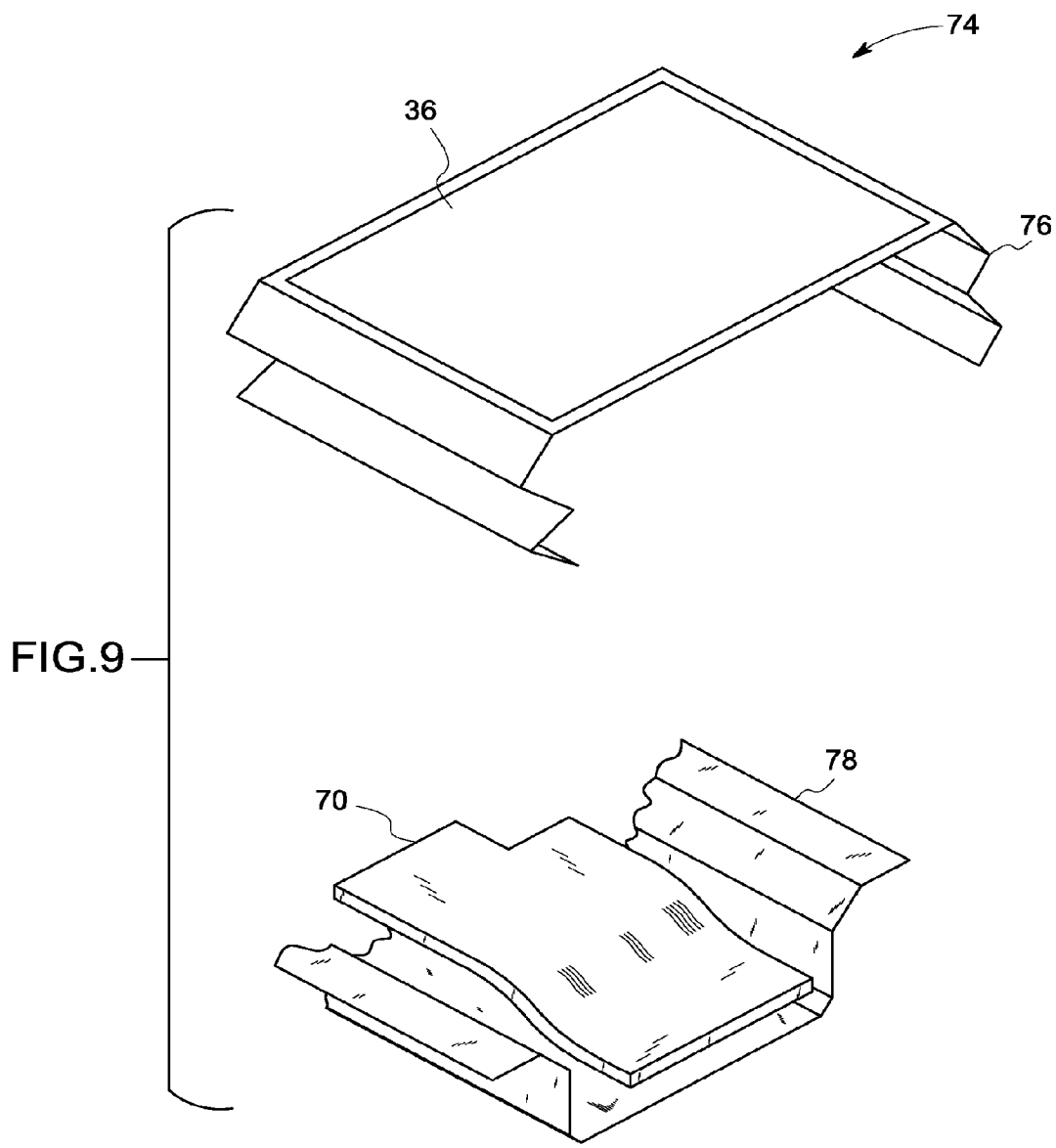

SEALING DEVICE AND METHOD FOR TURBOMACHINERY

BACKGROUND

The present invention relates generally to the field of seals used in turbomachinery, and in particular to a compliant seal for application at the interface of a rotating component, such as the rotor blades in a turbine, and a stationary component, such as a shroud in a turbine.

A number of applications call for sealing arrangements between rotating and stationary components. Such seals may vary in construction, depending upon such factors as the environments in which they function, the fluids against which they form a seal, and the temperature ranges in which they are anticipated to operate. In turbine and similar applications, for example, seals are generally provided between the various stages of rotating components, such as turbine blades, and corresponding stationary structures, such as housings or shrouds within which the rotating components turn.

Efficiency and performance of gas and steam turbines are affected by clearances between rotor blade tips and the stationary shrouds, as well as between the nozzle tips and the rotor. In the design of gas and steam turbines, it is desirable to have a close tolerance between the tips of the rotor blades and the surrounding static shroud. In a turbine stage, any portion of the working fluid passing through the clearance between the tips of the rotor blades and the static shroud does no work on the rotor blades, and leads to a reduced work efficiency of the turbine stage. Likewise, such leakage in a compressor stage leads to a reduced compression efficiency. Generally, the closer the shroud or stationary component surrounds the tips of the rotor blades, the greater is the efficiency of the turbomachinery.

However, the clearance dimensions between the rotor blade tips and the shroud vary during various operating modes of the turbine engine. A significant reason for this is the dissimilar thermal growth within the engine between the blade tips of the rotor and the shroud surrounding them. In such a case, the high temperature of the working fluid causes a thermal discrepancy between the shroud and the rotor blades, wherein the shroud is at a lower temperature than the rotor blades. The time interval until the thermal equivalence between the shroud and the blades is restored may be referred to as the transient period. The clearance between the shroud and the blades decreases during this transient period as the components reach their steady state conditions and dimensions, and causes the interfacing surfaces to rub, thereby leading to rapid wear of the blade material.

Mechanical and aerodynamic forces can also affect the clearance at the interface of a static shroud and the rotor blade tips. Clearance changes in certain turbine configurations may result from the turbine passing through critical speeds. Compliant seals may be needed to accommodate such clearance changes. This can also lead to interference between rotor blades and the shroud. In certain applications, such as aircraft engines, mechanical forces during operation (such as take-off and landing) can result in similar clearance changes.

Prior methods to solve the above problems include using a seal on the stationary shroud surface, the sealing material being designed to be wearable or abradable with respect to the rotor blade rubbing against them. In such a system, during the transient period, the blade tip contacts or rubs against the shroud, causing the shroud material to abrade or flake off. This avoids damage to the rotating elements, and provides reduced clearances and thus better sealing compared to a non-abradable system, in which large cold-built clearances have to be provided to prevent rubbing during the transient period. However, this abradable system suffers from the disadvantage of reduced life of the sealing material. Also, previous abradable seals, even though various materials for the shroud have been proposed such as sintered metal, metal honeycombs and porous ceramics, have not provided a desirable flexibility. After wear due to a transient condition, such as a thermal transient or shock loading, the gap or wear produced by the rub or contact is larger than the interference depth, due to tearing out, galling and spalling.

A different approach is also known in the art, and involves the use of brush-seals on the inner surface of the stationary shroud. One implementation of brush-seals involves the use a plurality of bristle packs supported on the inner periphery of the stationary shroud, such that the bristle distribution at the inner diameter of the bristle packs is substantially continuous. The inner diameter of the bristle packs can serve as a moderately compliant surface, which, due to the bending of the bristles, is compressed radially outwards when the shroud-rotor blade clearance decreases. However, while brush seals generally work satisfactorily for steam turbines, and for compressor stages, where temperatures do not exceed 650 to 700 degrees centigrade, they may not be always suitable for first or second stage gas turbines, where the temperature can exceed 800 degrees centigrade. Furthermore, such seals have an inherently porous nature due to their fibrous structure, and lead to leakage of the working fluid. Brush seals are also known to be subject to wear due to the continuous rubbing between the bristles and the blade tips. Moreover, the intermittent nature of certain shrouds may result in problems with bristles of such brush seals as the shroud crevices are contacted by the bristles.

There is a need, therefore, for a sealing device, for application at the interface of the rotating components, such as the blade tips of a turbine or compressor, and the stationary components, such as a shroud, which would substantially comply with the relative changes in radial clearance between the blade tips and the shroud, so as to minimize the damage caused to the rotating parts, as well as the wear on the shroud-tip material. There is further a need for a sealing device which is capable of withstanding the high temperatures in different steam or gas turbine stages, while effectively reducing the leakage of the working fluid, so as to improve the engine efficiency.

BRIEF DESCRIPTION

The invention provides a novel sealing approach designed to respond to such needs. In one exemplary embodiment, a seal assembly for a turbomachine comprises a substantially wear-resistant surface disposed as a tip of the seal assembly, and a biasing member. The turbomachine comprises a stationary housing and a plurality of blades mounted for rotation about an axis. The substantially wear-resistant tip surface is positioned physically proximate to tips of the blades and the biasing member is disposed intermediate the substantially wear-resistant surface and the stationary housing. The seal assembly is thus biased against the tips of the plurality of blades.

Another aspect of the present techniques is directed toward a method of compliant sealing a gas path between static and rotating components of a turbine. A substantially wear-resistant surface is engaged against a tip of the rotating component. A biasing member is disposed intermediate the substantially wear-resistant surface and the static component. The gas path between the static and the rotating components is sealed by biasing the wear-resistant surface, to urge the wear-resistant surface against the rotating component.

DRAWINGS

These and other features, aspects, and advantages of the present invention will become better understood when the following detailed description is read with reference to the accompanying drawings in which like characters represent like parts throughout the drawings, wherein:

FIG. 8 is an exploded perspective view of an embodiment of the seal assembly in which a wave spring serves as a biasing element; and FIG. 9 is an exploded perspective view of a further exemplary embodiment of a wave spring implementation of the seal assembly.

DETAILED DESCRIPTION

Figure 1:
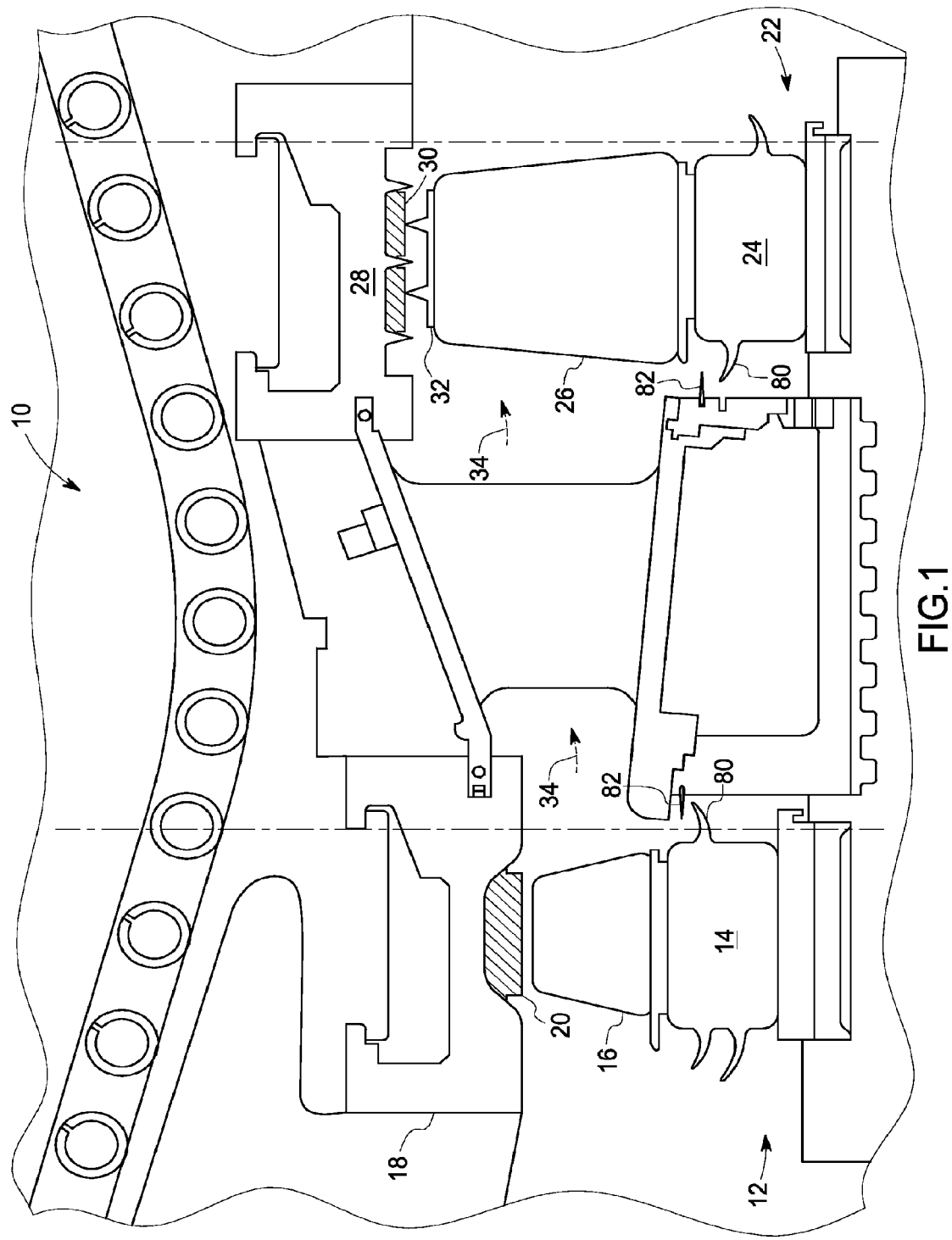
FIG. 1 is a cross sectional view of a portion of a turbine engine illustrating various turbine stages, wherein a compliant seal assembly in accordance with aspects of the present techniques is employed.

Referring now to FIG. 1, there is illustrated an exemplary portion of a turbine engine, designated generally by the reference numeral 10. Turbine 10 receives a hot gas, generated by an array of combustors (not shown in the figure), which transmit the hot gas along an annular hot gas path 34, as described below. Turbine stages 12, 22 are disposed along the annular hot gas path 34. Each such stage includes a rotor assembly, comprising a plurality of circumferentially spaced rotor blades or buckets, and a stationary shroud assembly. Each stage also includes a seal assembly for sealing a passage of the hot gas between tips of the rotating blades and the stationary shroud. For example, as shown, stage 12 comprises a rotor assembly 14, including a plurality of circumferentially spaced blades 16, a stationary shroud assembly 18, and a seal assembly 20 engaged at an interface of the rotating blades 16 and the stationary shroud 18. Similarly, stage 22 comprises a rotor assembly 24, including a plurality of circumferentially spaced blades 26, a stationary shroud assembly 28, and a seal assembly 30 engaged at an interface of the rotating blades 26 and the stationary shroud 28.

Generally, in higher turbine stages, each rotating blade or bucket may have a partial shroud at its tip, so that adjacently positioned shrouded blades form a continuous rotating ring. Each bucket shroud may have one or two rails or knife-edge ridges as shown. This design provides a better seal against leakage of the hot gas between the tips of adjacent blades, at high temperatures. Such a turbine stage is referred to hereinafter as a shrouded stage. In the implementation shown in FIG. 1, the rotor assembly 24 is a shrouded stage, wherein each blade 26 comprises a partial shroud 32 at its tip. In contrast, stage 12 is shown to be an unshrouded stage, comprising bare blades 16 mounted on the rotor assembly 14. As will be appreciated hereinafter, the proposed seal assembly and the present sealing technique can be employed in a shrouded as well as an unshrouded turbine stage.

Figure 2:
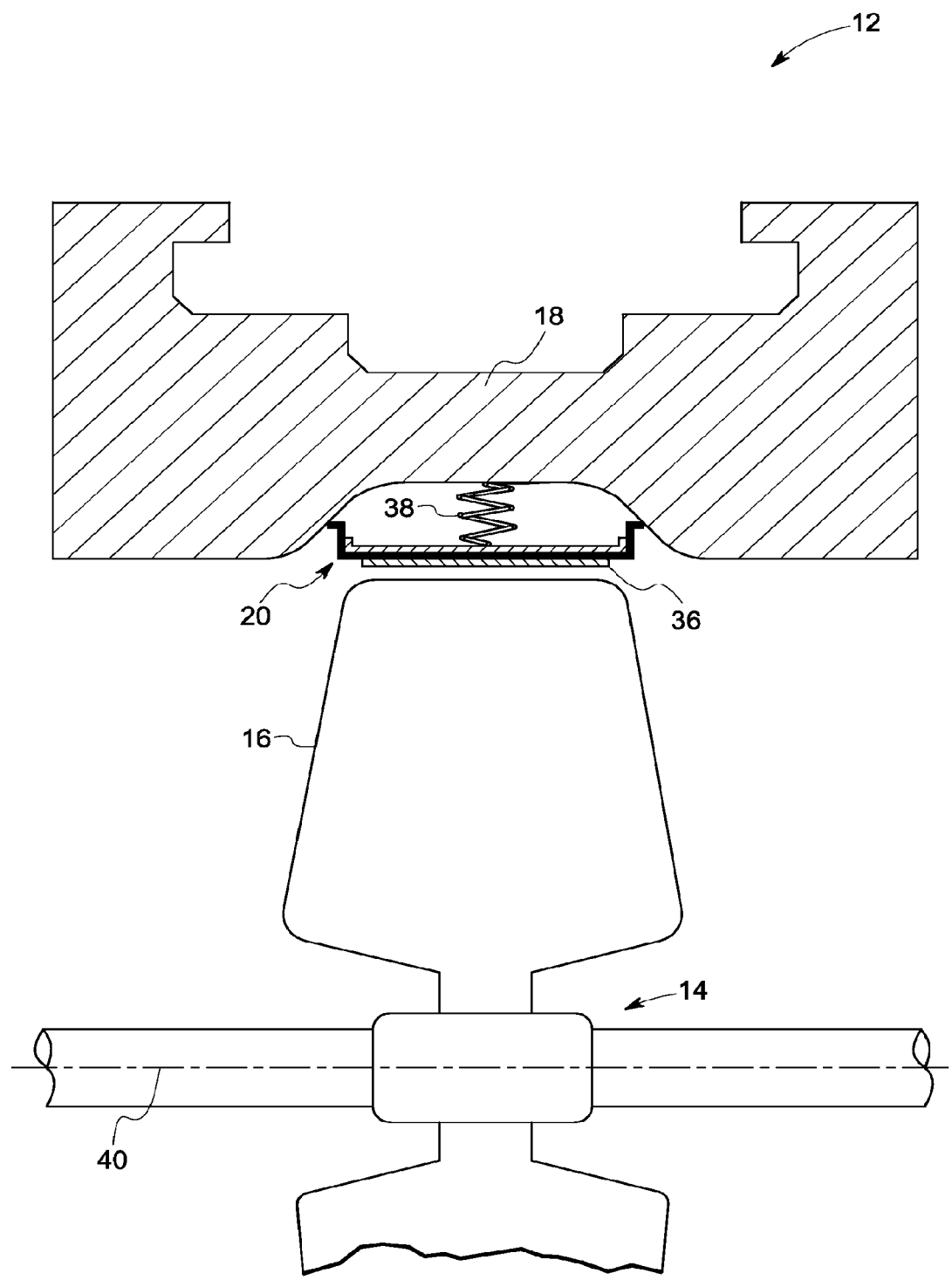
FIG. 2 is a cross sectional view schematically illustrating the compliant seal assembly implemented in an unshrouded turbine stage in accordance with aspects of the present techniques.

FIG. 2 illustrates an embodiment of an exemplary sealing mechanism in accordance with the present techniques as employed in the unshrouded turbine stage 12 shown in FIG. 1. FIG. 2 represents a partial cross sectional view of the stage 12, wherein the circumferential direction is perpendicular to the plane of the paper. Rotor blade 16 rotates about an axis 40 on being subjected to the hot gas flow from the combustor (not shown in the figure). The shroud assembly 18 surrounds the blade 16 and is substantially concentric with the axis 40. The seal assembly 20, engaged at the interface of the blade 16 and the shroud 18, incorporates a compliant sealing mechanism, which is discussed hereinafter.

The compliant seal assembly 20 broadly comprises a hard-coated seal surface 36, and a biasing member 38. The hard-coated seal tip surface 36 is closely positioned to the tip of the blade 16. The clearance between the blade tip and hard coating is set based on the engine clearance transient profile. The surface 36 is generally made of a hard ceramic material, such as aluminum oxide (Al2O3), or a hard metallic or cermet coating (Triballoy-cobalt based, WC-CoCr, Cr carbide-NiCr) which is substantially resistant to wear caused by rubbing of the tip of the blade 16 against it, at least during a thermal transient period (i.e., during a period of dissimilar thermal growth between the rotating and the static components).

The biasing member 38 is disposed between the seal surface 36 and the inner periphery of the shroud assembly 18. The biasing member 38 essentially comprises a biasing element, which exhibits a required degree of elasticity. To provide an effective seal, the wear-resistant surface 36 is biased toward the blade 16 by preloading the biasing element, to urge the seal surface 36 against the tip of the blade 16, at least during certain phases of operation of the turbine. On any incident contact or rub between the tip of the blade 16 and the hard-coated surface 36, such as during a thermally transient stage, the biasing member 38 tends to be compressed in response to the load created by the contact of the tip of the blade 16 to the hard-coated surface 36. As a result, the material wear of the shroud surface 36 is reduced. Normal clearance between the blade tips and the shroud is restored once a thermally stable stage is reached. It is estimated that the proposed mechanism can help achieve a compliance of up to 95%. This means that, for a radial interference of 100 millimeters (mm) between the static and rotating components, 95 mm of the incursion will be taken up by the compression of the compliant member 38, and 5 mm will be taken up by wear of the hard-coated surface 36, with nearly negligible wear of the blade material.

It should be noted that, as used herein, the term "biasing" or "bias" is intended to mean "urging" or "urge" respectively, or "energizing" or "energize." As described below, the role of the biasing members or elements in the present context is to provide some degree of loading or force on the seal surface. But this force is considerably lower than a force that would result from a rigid seal surface, therefore, reducing the loading force on the rotating blade when there is rubbing contact. This biasing or energizing action enables the assembly to become more compliant, reducing wear while providing a good seal at the location of the seal surface.

Figure 3:
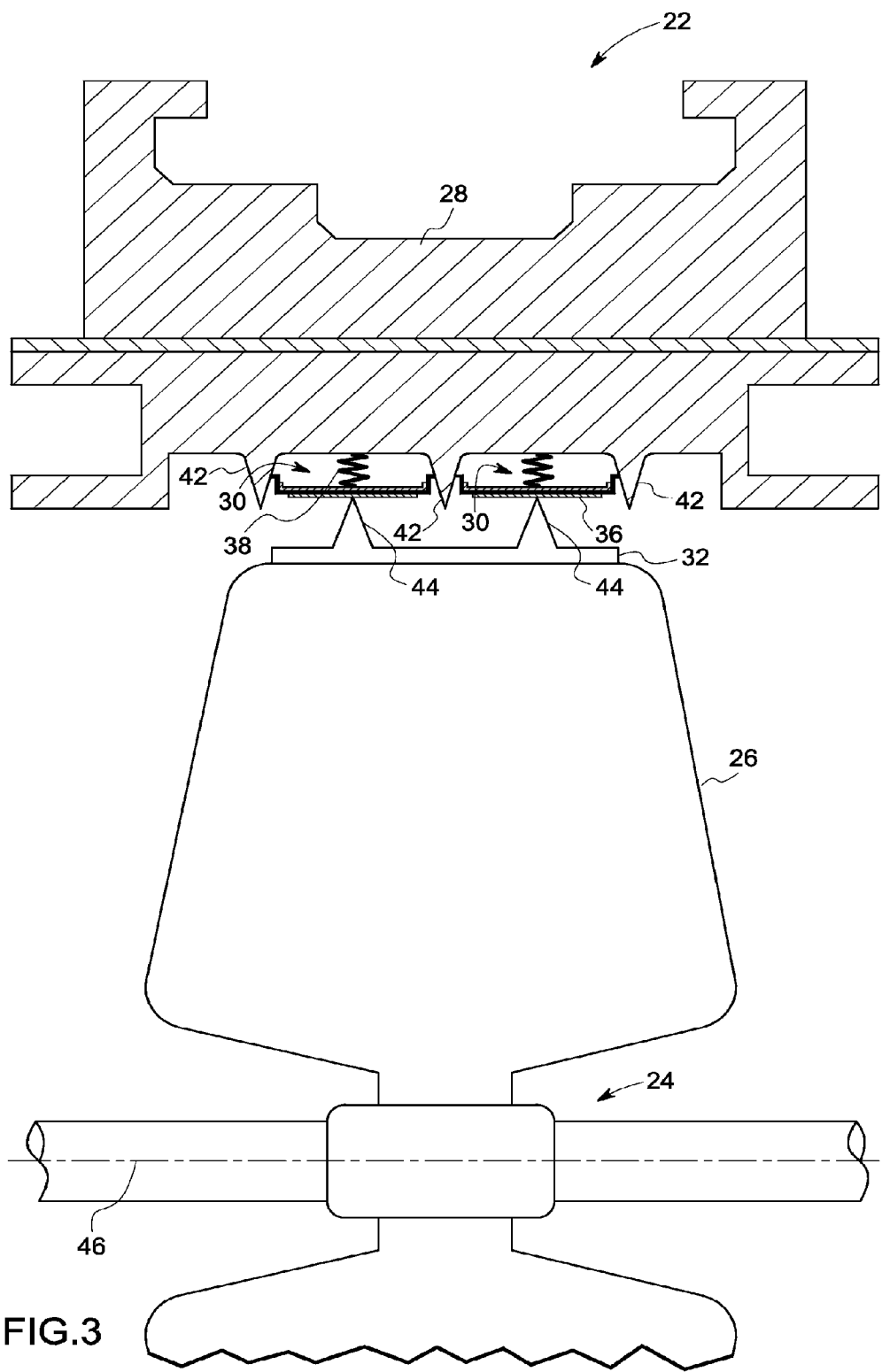
FIG. 3 is a cross sectional view schematically illustrating the compliant seal assembly implemented in a shrouded turbine stage in accordance with aspects of the present techniques.

FIG. 3 illustrates an exemplary implementation of the compliant seal assembly 30 in a shrouded turbine stage, designated generally by the reference numeral 22. The figure represents a partial cross sectional view, wherein the circumferential direction is perpendicular to the plane of the paper. As described earlier, each blade 26 has a partial shroud structure 32 at its tip. The shrouded tips 32 of adjacently positioned blades form a substantially continuous rotating inner ring, also referred to as an inner or rotating shroud. The stationary shroud 28 forms a continuous outer ring, which is substantially concentric with the rotor axis 46, and is referred to as an outer or stationary shroud.

The partial shroud 32, at the tip of the blade 26 consists of rail or knife-edges 44, generally two in number. The knife-edges 44 on the inner shroud form substantially continuous circumferential rails directed radially outwardly. The inner periphery of the outer shroud has a plurality of continuous knife-edges 42 directed radially inwards. The knife-edges on the inner shroud mesh with the knife-edges on the outer shroud, to form a labyrinth structure as illustrated in the figure. According to the embodiment illustrated in FIG. 3, a compliant seal 30 is disposed between two consecutive knife-edges on the outer shroud. Similar to the seal assembly for an unshrouded stage, each compliant seal assembly 30 for a shrouded turbine stage comprises a hard-coated surface 36 positioned proximate to the knife-edges 44 on the inner shroud, and a partially elastic biasing member 38 disposed between the hard-coated surface 36 and the outer shroud 28. Sealing of a hot-gas passage between the inner shroud 32 and the outer shroud 28 is affected by preloading the biasing member 38, to urge the hard-coated surface 36 against the knife-edges 44 on the inner shroud 32.

Figure 4:
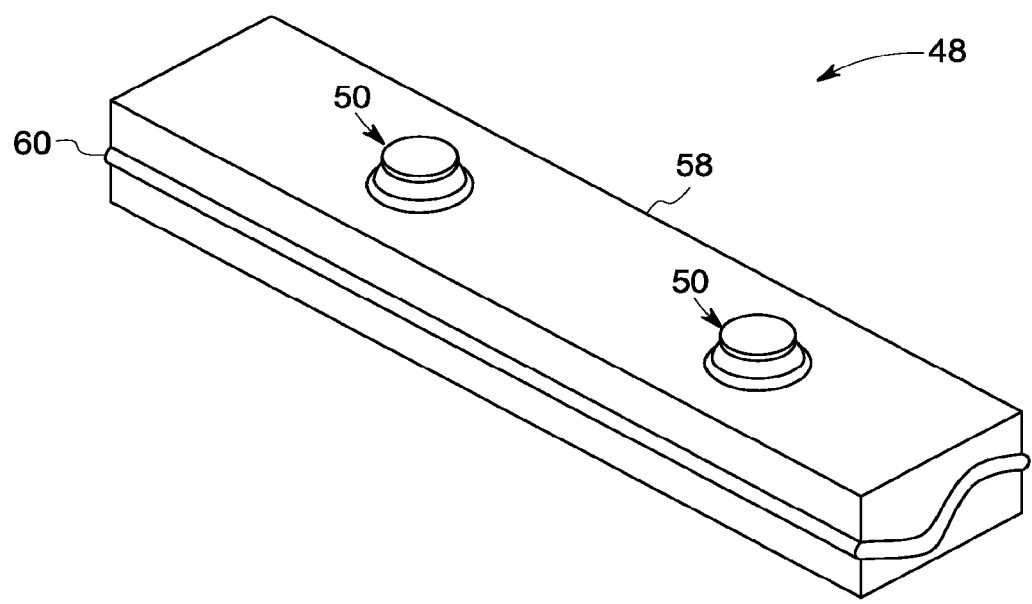
FIG. 4 is a perspective view of a portion of a compliant seal assembly of the type illustrated in the previous figures, using a spring plunger for biasing the seal assembly towards a rotating component.

FIG. 4 illustrates a perspective view of one embodiment of a compliant seal assembly 48 according to aspects of the present techniques, using a spring plunger as the biasing member. FIG. 4 shows one segment of the seal assembly. Generally, the seal assembly comprises multiple such segments assembled adjacent to each other forming a ring. The biasing member includes one or more spring plungers 50, disposed on a backing 58. It should noted that such biasing elements may be in-line or off-set to one another around the periphery of the shroud. Moreover, the biasing elements may have different stiffnesses or mechanical properties. Spring plungers 50 protrude above the backing 58 in the form of spring buttons. In practice, the assembly shown in FIG. 4 may have an actuate shape that follows the contour of the outer shroud against which it fits, as well as the contour of the blades or inner shroud towards which the seal assembly is urged.

Figure 5:
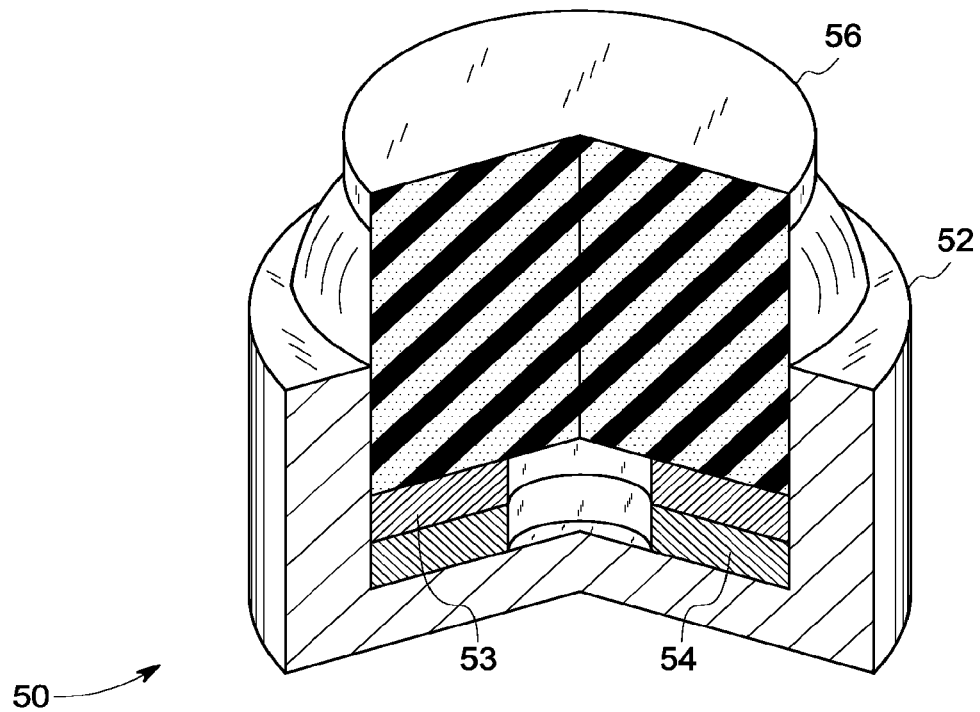
FIG. 5 is a perspective view of the spring plunger shown in FIG. 4.

Referring now to FIG. 5, there is shown a partially sectioned perspective view illustrating the spring plunger shown in FIG. 4, the section being cut along a plane represented by an arrow 1 shown in FIG. 4. The spring plunger 50 includes a biasing element comprising a plurality of spring washers, represented in the figure as 53, 54, in a stacked arrangement. The spring washers 53, 54 generally comprise a high-temperature resistant and creep-resistant metal alloy, which includes, but is not limited to steel, or nickel-based alloys, amongst others. Generally, for higher operating temperature in the turbine stage, nobler metals may be more suitable in the spring washers. The spring washers 53, 54 are disposed in an enclosure 52, which is received on or within the backing 58 shown in FIG. 4. The spring plunger further comprises buttons 56, which protrude out of the enclosure 52.

Figure 6:
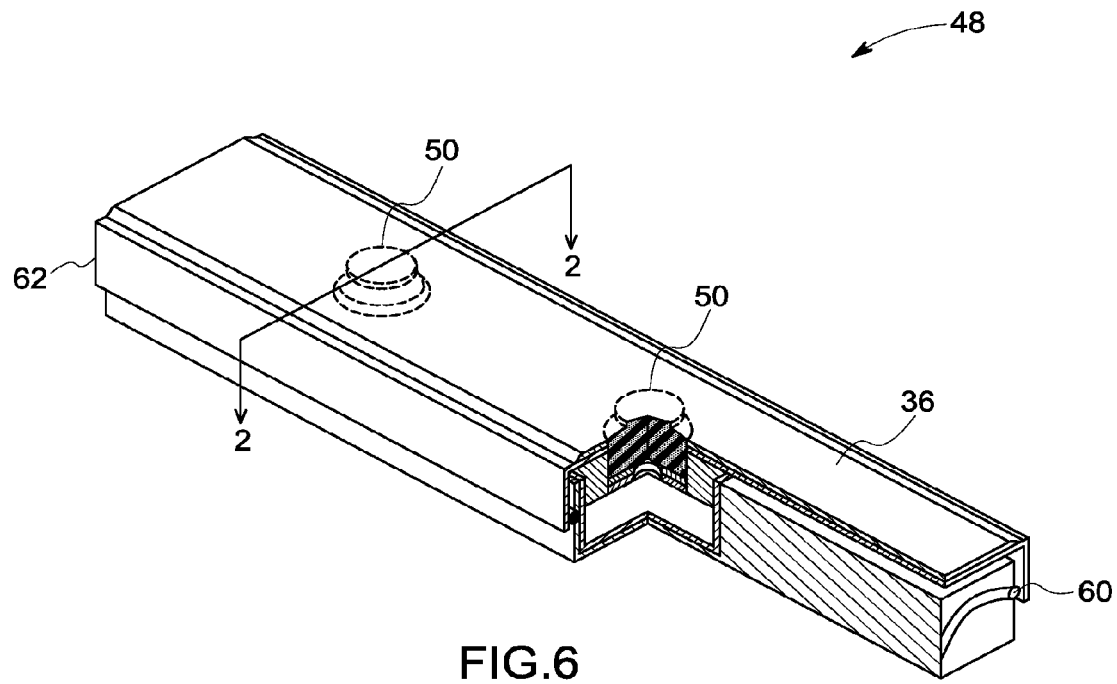
FIG. 6 is a partially sectioned perspective view of the seal assembly shown in FIG. 4.
Figure 7:
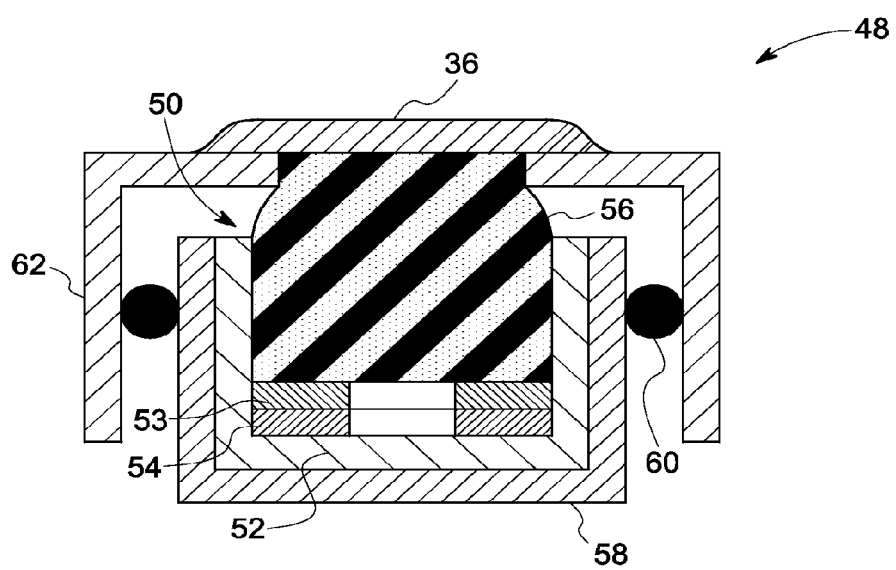
FIG. 7 is a sectional view showing the structural details of the assembly shown in FIG. 6.

FIG. 6 represents a partially sectioned perspective view of the seal assembly 48, showing a cut-section through the spring plunger 50. FIG. 7 is a cross-sectional view of the section through the spring plunger 50, cut along a plane represented by an arrow 2 shown in FIG. 6. Referring now to FIG. 6 and FIG. 7, a box shaped skirt 62 is disposed on top of the protruding buttons 56. The skirt 62, open at the bottom, is spring-loaded by the spring plunger 50, and is flexible in a radial direction. The clearance between the backing 58 and the skirt 62 depends on the number and configuration of spring washers, and the height of the enclosure 52. To prevent a possible passage of hot gas between the skirt 62 and the backing 58, a secondary sealing element 60, such as a ceramic rope seal may be engaged at an interface of the skirt 62 and the backing 58. The hard-coated tip surface 36 is disposed on the outer surface of the skirt 62, and is positioned proximate to the rotating components such as the tip of the blades, or rails.

An alternative embodiment of a mechanism to seal compliantly in accordance with the present techniques uses a biasing member comprising a wave spring as the biasing element. FIG. 8 is an exploded perspective view illustrating an exemplary embodiment of a compliant seal assembly using a wave spring implementation. The compliant seal assembly may, depending upon the size of the turbine engine, comprise a complete ring, or a plurality of segments.

Referring now to FIG. 8, a segment of the compliant seal assembly, generally represented by the reference numeral 64, includes a wave spring 70 as the biasing element, and a hard-coated tip surface 36. The number of waves per segment, the width of the wave, and the height of the wave depend largely on the radial compliance required, as well as on the elasticity of the material of the wave spring. The wave spring material comprises high temperature resistant and creep resistant alloys including but not limited to steel, nickel based alloys, among others. The wave spring 70 is disposed within an enclosure, such as a box. The enclosure comprises an upper half 66 and a lower half 68, wherein the wave spring 70 is disposed between the two halves. In one particular mode of manufacturing, the wave spring 70 is spot-welded to the upper half 66 of the enclosure. The tip surface 36, preferably comprising a ceramic material as discussed above, is disposed on the outer surface of the upper half 66 of the enclosure. The tip surface 36 rubs against the tip of the blades or the rails during the transient stage, while the wave spring 70 is compressed radially, to minimize the wear on the tip surface 36. In the illustrated embodiment, edges of the upper half 66 of the enclosure slide into or interlock with edges of the lower half 68. Passage of hot gas between the upper half 66 of the enclosure and the lower half 68 is sealed by a secondary sealing member 72. The secondary sealing member 72 may include a ceramic rope seal, disposed at an interface of the upper and lower half of the enclosure, at the edges.

FIG. 9 shows an exploded perspective view of an alternate arrangement for a compliant seal assembly 74 having a wave spring as a biasing element. In this arrangement, the upper half 76 of the enclosure comprises a bellow-like structure, or an accordion-shaped configuration as shown in FIG. 9, at its two edges. This accordion-shaped configuration, in conjunction with the wave spring 70, provides the desired flexible sealing against the passage of hot gas between the upper half 76 and the lower half 78 of the box. The bellows-like structure may have slits to allow for the natural radius or curvature of the turbine shroud. For an effective sealing, the radial compliance of the box comprising the accordion-shaped configuration is generally lower than the radial compliance of the wave spring.

The aforementioned embodiments of the proposed techniques provide an effecting sealing of a gas path between rotating and static components in a turbine or similar machine, while appreciably reducing wear on the rotating components and the abradable material on the seal. The aforementioned embodiments are, however, are not limited by use to a turbine stage. The proposed seal assembly and the methods incorporated therein can also be employed in a compressor stage or even at an inner diameter of a nozzle of an inter-stage. Moreover, the arrangement offers distinct advantages over brush seal arrangements, particularly where an inner rotating element or set of elements (e.g. turbine blades) are partially shrouded as described above.

It should be noted that the technique described above may be used in other environments and locations within turbines and other machinery as well. For example, the arrangements described above may be used for shaft seals as well as for turbine blade or bucket seals as described. Similarly, the complaint structure of the sealing arrangement described herein can be applied in the inter stages in turbines, such as in angel wings, designated by 80 in FIG. 1. The compliant seal may be disposed at locations designated by reference numeral 82 in FIG. 1.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seal assembly for a turbomachine, the turbomachine comprising a stationary housing and a plurality of blades mounted for rotation about an axis, the seal assembly comprising:
   a substantially wear-resistant surface disposed as the tip of the seal assembly, the substantially wear-resistant surface being positioned physically proximate to tips of the plurality of blades; and
   a biasing member disposed intermediate to the substantially wear-resistant surface and the stationary housing, wherein the wear resistant surface is biased towards the tips of the plurality of blades.

2. The seal assembly of claim 1, wherein the stationary housing is a casing of a compressor stage or a static shroud assembly of a turbine stage.

3. The seal assembly of claim 1, wherein the substantially wear-resistant surface comprises a ceramic material.

4. The seal assembly of claim 1, wherein the substantially wear-resistant surface comprises a metallic material.

5. The seal assembly of claim 1, wherein the substantially wear-resistant surface comprises a cermet material.

6. The seal assembly of claim 1, wherein the biasing member comprises a plurality of spring plungers, each spring plunger further comprising:
   an enclosure;
   an biasing element disposed within the enclosure; and
   a protruding button disposed on the substantially wear-resistant surface.

7. The seal assembly of claim 6, wherein the biasing element comprises a plurality of spring washers.

8. The seal assembly of claim 6, wherein the biasing element comprises a high temperature resistant and creep resistant metal alloy.

9. The seal assembly of claim 6, further comprising:
   a backing supporting the spring plungers;
   a skirt disposed on the backing, the skirt having a box shape, wherein the skirt is open at a bottom thereof; and
   a secondary sealing element disposed at an interface of the skirt and the backing.

10. The seal assembly of claim 1, wherein the biasing member includes an biasing element comprising at least one wave of a wave spring disposed intermediate the stationary housing and the substantially wear-resistant surface.

11. The seal assembly of claim 10, wherein the wave spring comprises a high temperature resistant and creep resistant metal alloy.

12. The seal assembly of claim 10, further comprising an enclosure positioned intermediate the substantially wear-resistant surface and the stationary housing, the enclosure further comprising an upper half and a lower half, wherein the wave spring is disposed intermediate to the upper half and the lower half of the enclosure.

13. The seal assembly of claim 12, wherein the upper half of the enclosure slides into the lower half of the enclosure at edges thereof.

14. The seal assembly of claim 13, further comprising a bellows at the edges of the upper half and the lower half of the enclosure.

15. The seal assembly of claim 13, further comprising a secondary sealing element disposed at an interface of the upper half and the lower half of the enclosure.

16. A method of sealing a gas path between a stationary housing of a turbomachine and a rotating element mounted on an axis of the turbomachine, the method comprising:
   engaging a substantially wear-resistant surface against a tip of the rotating element;
   disposing a biasing member intermediate to the substantially wear-resistant surface and the stationary housing; and
   urging the substantially wear-resistant surface toward the rotating element via the biasing member.

17. The method of claim 16, wherein the biasing member includes a plurality of spring plungers, wherein each spring plunger comprises an enclosure, an biasing element disposed within the enclosure and a protruding button disposed toward the substantially wear-resistant surface.

18. The method of claim 17, wherein the biasing element includes a plurality of spring washers in stacked arrangement.

19. The method of claim 18, further comprising:
   disposing a backing within the enclosure to support the spring plungers;
   disposing a skirt on top of the backing and having the shape of a box open at the bottom; and
   disposing a secondary seal at an interface of the skirt and the backing to seal gas passage between the skirt and the backing.

20. The method of claim 16, wherein the biasing member includes at least one wave spring disposed intermediate to the substantially wear-resistant surface and the stationary housing.

21. The method of claim 20, further comprising:
   disposing an enclosure intermediate to the substantially wear-resistant surface and the stationary housing, the enclosure comprising an upper half and a lower half; and
   disposing the wave spring intermediate to the upper half and the lower half of the enclosure.

22. The method of claim 21, further comprising welding edges of the lower half of the enclosure to edges of the upper half to form a bellows and to seal a gas passage between the upper half and the lower half of the enclosure.

23. The method of claim 22, wherein an inner and an outer bellows-like structure containing slits form the flexible edge seal.

24. The method of claim 21, further comprising disposing a secondary seal at an interface between the upper half of the enclosure and the lower half thereof to seal a gas passage therebetween.

25. A turbine comprising:
a rotor assembly comprising a plurality of blades mounted for rotation about an axis;
a shroud assembly surrounding the plurality of blades; and
a compliant seal assembly disposed intermediate to the tips of the plurality of blades and the stationary shroud assembly, the compliant seal assembly further comprising:
a substantially wear-resistant surface positioned physically proximate to the blade tips; and
a biasing member disposed intermediate to the substantially wear-resistant surface and the stationary shroud assembly to bias the substantially wear-resistant surface against the tips of the plurality of blades.

26. The turbine of claim 25, wherein the substantially wear-resistant surface comprises a ceramic material.

27. The turbine of claim 25, wherein the biasing member comprises a plurality of spring plungers, each spring plunger further comprising an enclosure, an biasing element disposed within the enclosure, and a protruding button disposed towards the substantially wear-resistant surface.

28. The turbine of claim 27, wherein the biasing element comprises a plurality of spring washers disposed in a stacked arrangement.

29. The turbine of claim 27, wherein the compliant seal assembly further comprises a backing supporting the spring plungers, a skirt disposed on top of the backing and having a box shape open at the bottom, and a secondary sealing element disposed at an interface of the skirt and the backing.

30. The turbine of claim 25, wherein the biasing member includes an biasing element comprising at least one wave of a wave spring disposed intermediate to the stationary shroud assembly and the substantially wear-resistant surface.

31. The turbine claim 30, wherein the compliant seal assembly further comprises an enclosure positioned intermediate to the substantially wear-resistant surface and the stationary shroud assembly, the enclosure further comprising an upper half and a lower half, wherein the wave spring is disposed intermediate to the upper half and the lower half of the enclosure.

32. The turbine of claim 31, wherein upper half and the lower half of the enclosure form a bellows.

33. The turbine of claim 31, wherein the compliant seal assembly further comprises a secondary sealing element disposed at an interface of the upper half and the lower half of the enclosure.

34. A turbine comprising:
a rotor assembly comprising a plurality of blades mounted for rotation about an axis, each blade comprising a partial shroud at tips thereof, wherein the partial shrouds at the tips of the plurality of blades are adjacently positioned to form a substantially continuous rotating inner ring;
a stationary shroud assembly forming a static outer ring surrounding the rotating inner ring; and
a compliant seal assembly disposed intermediate to the rotating inner ring and the static outer ring, the seal assembly comprising a substantially wear-resistant surface positioned proximate to the rotating inner ring; and
a biasing member disposed intermediate to the substantially wear-resistant surface and the stationary shroud assembly to bias the substantially wear-resistant surface against the rotating inner ring.

35. The turbine of claim 34, wherein an outer periphery of the rotating inner ring comprises a plurality of knife-edges directed radially outwards, an inner periphery of the static outer ring comprises a plurality of knife edges directed radially inwards, and wherein the knife edges on the inner ring are alternately arranged with the knife edges on the outer ring, forming a labyrinth structure.

36. The turbine of claim 35, wherein the compliant seal assembly is disposed intermediate to two consecutive knife-edges on the inner periphery of the static outer ring.

37. The turbine of claim 36, wherein the substantially wear-resistant surface comprises a ceramic material.

38. The turbine of claim 36, wherein the biasing member comprises a plurality of spring plungers, each spring plunger comprising an enclosure, an biasing element disposed within the enclosure, and a protruding button disposed toward the substantially wear-resistant surface.

39. The turbine of claim 38, wherein the biasing element comprises a plurality of spring washers disposed on top of each other.

40. The turbine of claim 38, wherein the compliant seal assembly further comprises a backing supporting the spring plungers, a skirt disposed on top of the backing and having a box shape open at the bottom, and a secondary sealing element disposed at an interface of the skirt and the backing.

41. The turbine of claim 36, wherein the biasing member includes an biasing element comprising at least one wave of a wave spring disposed intermediate to the stationary shroud assembly and the substantially wear-resistant surface.

42. The turbine claim 41, wherein the compliant seal assembly further comprises an enclosure positioned intermediate to the substantially wear-resistant surface and the stationary shroud assembly, the enclosure further comprising an upper half and a lower half, wherein the wave spring is disposed intermediate to the upper half and the lower half of the enclosure.

43. The turbine of claim 42, wherein upper half and the lower half of the enclosure form a bellows.

44. The turbine of claim 42, wherein the compliant seal assembly further comprises a secondary sealing element disposed at an interface of the upper half and the lower half of the enclosure.

* * * * *